July 20, 1965 W. SCHNEIDER 3,196,265
VEHICLE BUMPER LIGHT
Filed Feb. 5, 1963
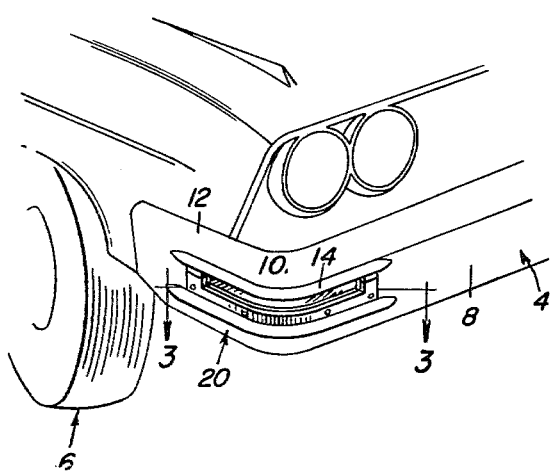
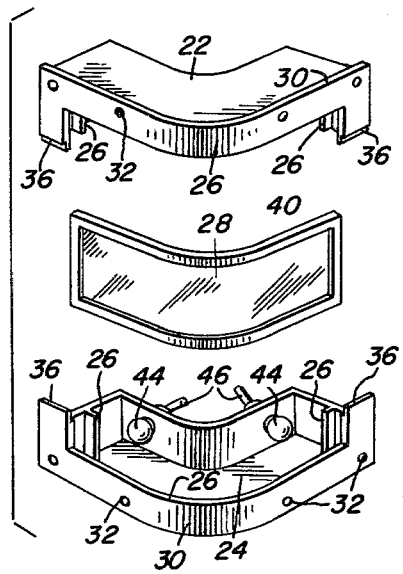
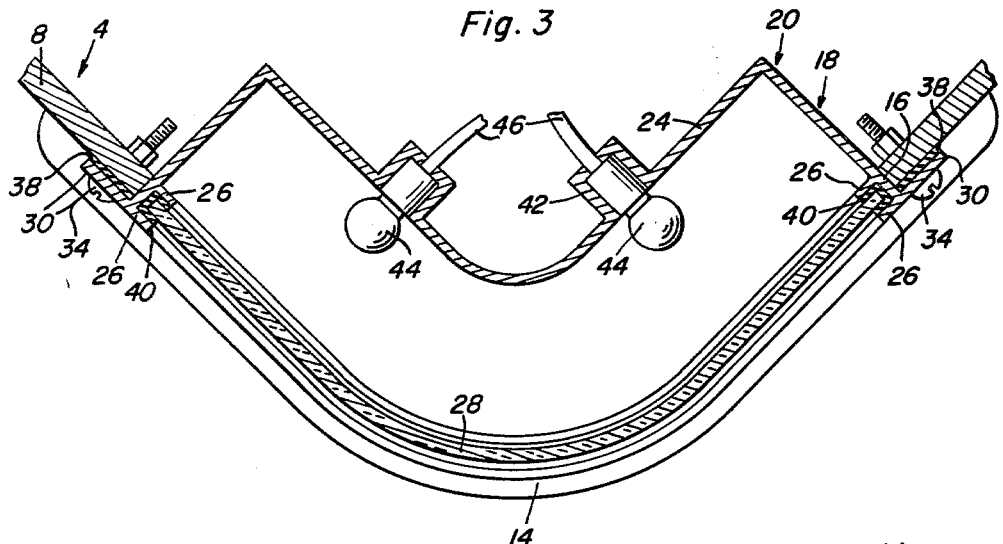
Willie Schneider
INVENTOR.

United States Patent Office 3,196,265
Patented July 20, 1965

3,196,265
VEHICLE BUMPER LIGHT
Willie Schneider, Orrin, N. Dak., assignor of one-half to Conrad J. Ziegler, Rugby, N. Dak.
Filed Feb. 5, 1963, Ser. No. 256,424
5 Claims. (Cl. 240—7.1)

This invention relates to new and useful improvements in motor vehicle bumpers, particularly but not necessarily, front bumpers and has for its primary object to provide, in a manner as hereinafter set forth, a device of this character having incorporated therein a unique construction and arrangement of distinctively colored safety or running lights for clearly indicating to approaching drivers the overall width of the vehicle, thus preventing head-on collisions.

Another highly important object of the present invention is to provide an improved bumper of the aforementioned character comprising novel means for protecting the safety lights.

A further object is to provide a vehicle bumper of the character set forth into which the lights may be incorporated at the time of manufacturing or thereafter.

Still another object is to provide a bumper of the character described wherein the lights are clearly visible to oncoming motorists and pedestrians from both the front and from the respective side of the vehicle.

Other objects are to provide a safety bumper of the character set forth which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view, showing an end portion of an installed bumper comprising a safety light embodying the present invention;

FIGURE 2 is an exploded perspective view of the safety light per se; and

FIGURE 3 is a view in horizontal section on an enlarged scale, taken substantially on the line 3—3 of FIGURE 1.

Referring now to the drawing in detail, it will be seen that reference numeral 4 designates generally a bumper of suitable metal which is mounted on the front of a motor vehicle 6. The bumper 4 includes a bar 8 comprising bends 10 which terminate in rearwardly extending, substantially right angularly projecting end portions 12.

The upper and lower portions of the bends 10 and the adjacent portions of the bumper bar 8 have formed longitudinally thereon spaced, parallel ribs or beads 14 the purpose of which will be presently set forth. Between the ribs or beads 14, the bumper bar 8 is further provided with elongated, longitudinal openings or slots 16. The openings 16 are for the reception of the housings or casings 18 of a pair of safety lights 20. The housings 18 are angulated or bent to conform to portions of the bumper bar 8 in which they are mounted. As the safety lights 20 are similar, a detailed description of one will suffice for both.

The casing 18 includes, in the embodiment shown, complemental upper and lower half-sections 22 and 24, respectively, which are inserted in the opening 16 from the front of the bumper bar 8. As shown, the casing sections 22 and 24 are separable. Also, the front of the casing 18 is open.

As shown to advantage in FIGURE 3 of the drawing, the front portion of the casing 18 has formed therein a pair of spaced flanges 26. The flanges 26 define a channel for the reception of the marginal portions of a lens 28. Of course, access is had to the lens channel by separating the sections 22 and 24 of the casing 18. The lens 28 conforms to the longitudinal shape of the casing 18 and said lens is distinctively colored, preferably green.

The front portion of the casing 18 is further provided with an external mounting flange 30. The flange 30 is provided with spaced apertures 32 for receiving suitable fasteners 34 for removably securing the casing 18 in the bumper bar 8.

The abutting ends of the flanges 30 of the casing sections 22 and 24 are rabbeted as indicated at 36 in a manner to interfit or interlock. Gaskets 38 are provided between the bumper bar 8 and the flanges 30 of the sections 22 and 24. Channel-shaped gaskets or the like 40 are provided on the marginal portions of the lens 28. If desired, the abutting edges of the casing sections 22 and 24 may be sealed in any suitable manner.

The lower section 24 of the casing 18 is provided with suitable electric sockets 42. The sockets 42 are for the reception of incandescent lamps 44. Conductor wires 46 electrically connect the lamps 44 to the usual ignition switch (not shown) of the motor vehicle 6.

It is thought that the operation of the invention will be readily apparent from a consideration of the foregoing. Briefly, when the ignition switch of the vehicle is turned on the lamps 44 are energized for illuminating the green lenses 28 in an obvious manner. When the safety lights on the outermost portions of the bumper 4 are thus illuminated, the overall width of the vehicle 6 may be clearly seen, as will be apparent. The construction and arrangement also is such that the safety light will be conspicuous when viewed from the front or from the side. The pairs of ribs or beads 14 protrude forwardly and beyond the ends of the light units 20 in a manner to shield or protect said units, especially the lenses 28 thereof. However, access may readily be had to the interior of the casings 18 for replacing the lenses, the lamps, etc., simply by removing the fasteners 34, removing the casings from the bar 8 and separating the sections 22 and 24 of said casings. To enhance the brilliance of the safety lights the interiors of the casings 18 are reflective.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle bumper comprising a bar, spaced ribs on the bar, said bar having an opening therein between the ribs, and a safety light mounted on the bar in the opening, said ribs protruding beyond the light for guarding same, said light including a casing having an open front and a lens therein, said casing comprising complemental, separable upper and lower half-sections engaged in the bar opening and held together by said bar, and electric lamps in the casing.

2. A vehicle bumper in accordance with claim 1, said sections including pairs of spaced, inwardly projecting flanges in their front portions defining channels receiving the marginal portions of the lens.

3. A vehicle bumper comprising a bar including a bent end portion having an elongated, longitudinal opening therein, a light unit comprising a removable annular casing including complemental, separable upper and lower half-sections engaged in the opening and held together by the bumper, said casing comprising a front having an opening therein, said half-sections having opposed communicating channels in the front portions thereof, and an angular lens in the opening, said lens being mounted in the channels and bridging the half-sections.

4. The combination of claim 3, said front comprising outwardly extending flanges including rabbeted, abutting interfitting end portions.

5. The combination of claim 4, together with spacer, parallel ribs on the bumper above and below the opening and terminating beyond the ends thereof and providing guards for the lens.

References Cited by the Examiner

UNITED STATES PATENTS

| | | | |
|---|---|---|---|
| 1,507,702 | 9/24 | Harris | 240—7.1 |
| 1,655,841 | 1/28 | Pattison | 240—7.1 |
| 2,221,721 | 11/40 | Reger | 240—7.1 |
| 2,873,358 | 2/59 | Dunker | 240—41.55 X |
| 2,880,306 | 3/59 | Witte | 240—10.65 |
| 2,891,140 | 6/59 | Huff | 240—7.1 |
| 2,981,828 | 4/61 | Worden | 240—8.18 |
| 3,110,883 | 11/63 | Nallinger et al. | 240—7.1 X |

OTHER REFERENCES

German application 1,070,512, printed Dec. 3, 1959.

NORTON ANSHER, *Primary Examiner.*